(12) United States Patent
Dembowsky et al.

(10) Patent No.: US 7,356,879 B2
(45) Date of Patent: Apr. 15, 2008

(54) ADJUSTING UNIT FOR ADJUSTING A SPACING BETWEEN TWO MEMBERS

(75) Inventors: Hans-Joachim Dembowsky, Hamburg (DE); Martin Jodeleit, Bielefeld (DE); Hans-Ulrich Figge, Schloβ-Holte (DE)

(73) Assignee: Bollhoff Verbindungstechnik GmbH, Bielefeld (DE)

( * ) Notice: Subject to any disclaimer, the term of this patent is extended or adjusted under 35 U.S.C. 154(b) by 43 days.

(21) Appl. No.: 11/190,788

(22) Filed: Jul. 27, 2005

(65) Prior Publication Data

US 2006/0032016 A1 Feb. 16, 2006

(30) Foreign Application Priority Data

Aug. 13, 2004 (DE) .................. 20 2004 012 733 U

(51) Int. Cl.
*E05F 5/02* (2006.01)
*F16B 5/02* (2006.01)
*F16B 5/06* (2006.01)

(52) U.S. Cl. ........................ 16/82; 248/188.4

(58) Field of Classification Search .................. 16/82, 16/85, 86 R, 86 A, 86 B; 248/188.4, 410, 248/411; 411/383, 384, 535, 182, 349, 549, 411/550, 551; 292/DIG. 14
See application file for complete search history.

(56) References Cited

U.S. PATENT DOCUMENTS

| | | | | |
|---|---|---|---|---|
| 4,924,549 A | * | 5/1990 | Morel et al. ................... | 16/82 |
| 5,092,550 A | * | 3/1992 | Bettini ..................... | 248/188.4 |
| 5,314,280 A | * | 5/1994 | Gagliardi et al. ........... | 411/182 |
| 5,335,396 A | * | 8/1994 | Dolan ............................ | 16/82 |
| 5,482,348 A | * | 1/1996 | Mass et al. ................. | 296/207 |
| 5,689,853 A | * | 11/1997 | Lemmer ...................... | 16/82 |
| 5,735,511 A | * | 4/1998 | Stocker et al. ......... | 267/140.13 |
| 6,039,388 A | * | 3/2000 | Choi .......................... | 296/207 |
| 6,088,878 A | * | 7/2000 | Antonucci et al. .......... | 16/86 A |
| 6,119,306 A | * | 9/2000 | Antonucci et al. .......... | 16/86 A |
| 6,261,042 B1 | * | 7/2001 | Pratt .......................... | 411/551 |
| 6,507,976 B2 | * | 1/2003 | Ichimaru ...................... | 16/82 |
| 6,857,166 B2 | * | 2/2005 | Nakagaki et al. ........... | 16/86 R |

FOREIGN PATENT DOCUMENTS

| | | |
|---|---|---|
| DE | 197 43 928 A1 | 4/1999 |
| DE | 696 10 046 T2 | 5/2001 |
| DE | 201 19 112 U1 | 2/2002 |
| DE | 101 47 141 | 4/2003 |

* cited by examiner

*Primary Examiner*—Robert J. Sandy
(74) *Attorney, Agent, or Firm*—Seyfarth Shaw LLP

(57) ABSTRACT

An adjusting unit for adjusting a spacing between a fixedly mounted first member and a resiliently mounted second member. The adjusting unit comprises an adjusting screw and a sleeve-like receiving member which are adjustable relative to each other via a pair of threads. The adjusting screw has an end provided with an abutment surface adapted to be supported against the resiliently mounted second member, and the receiving member has an annular flange adapted to be supported against the fixedly mounted first member such that the spacing between the first and second members is adjustable by adjusting movements of the adjusting screw relative to the receiving member.

15 Claims, 3 Drawing Sheets

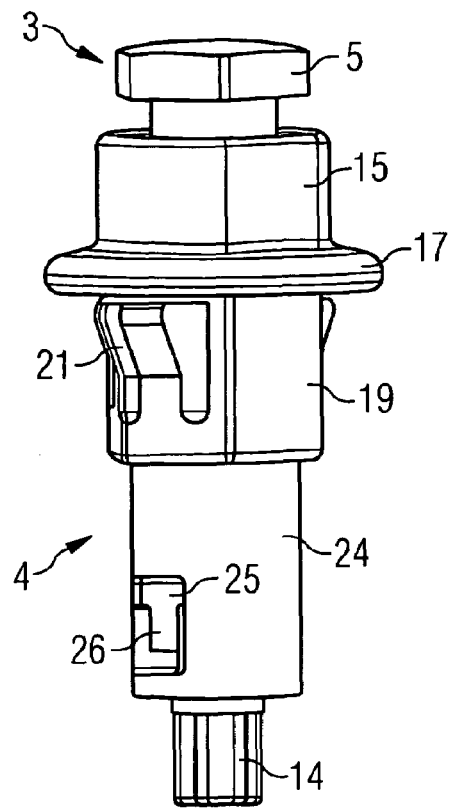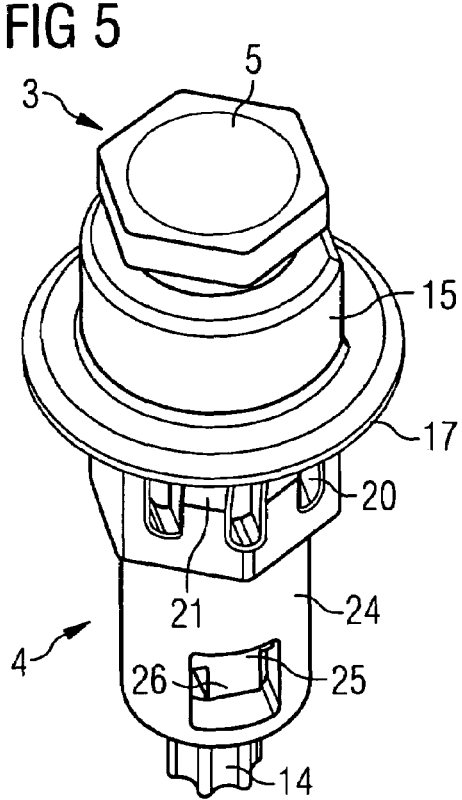

FIG 6
FIG 8
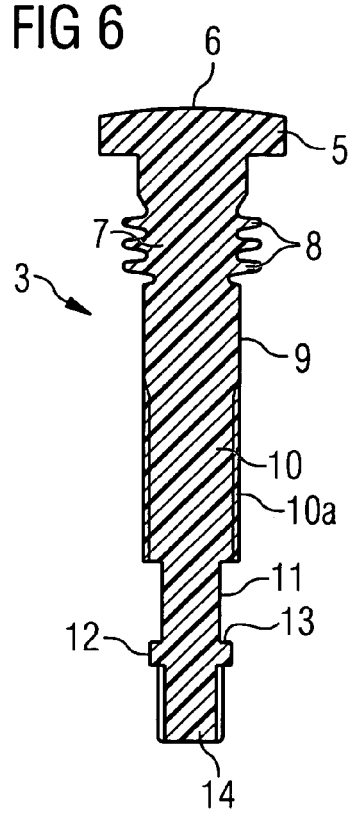
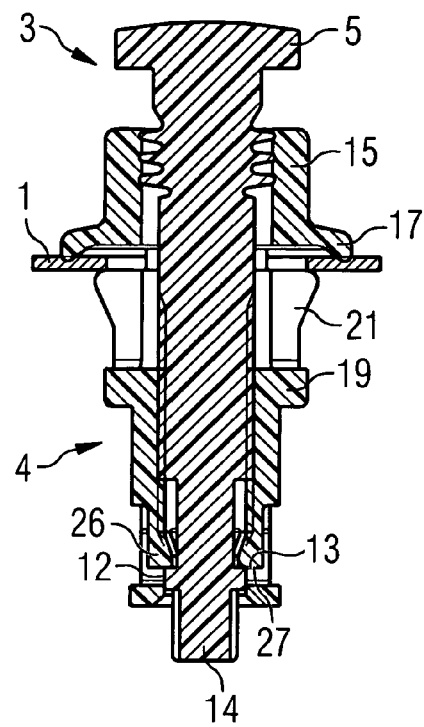
FIG 7
FIG 9
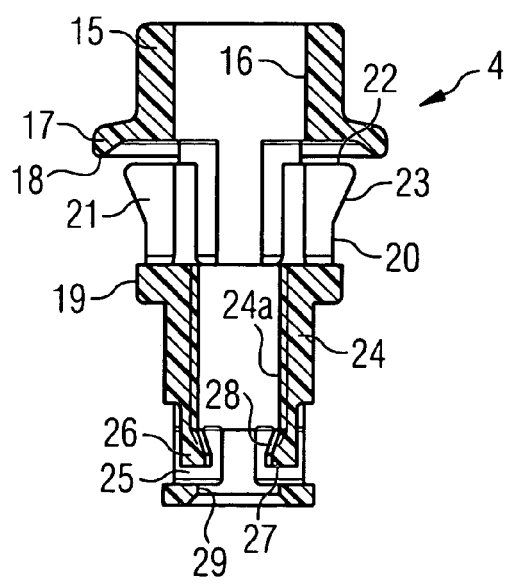
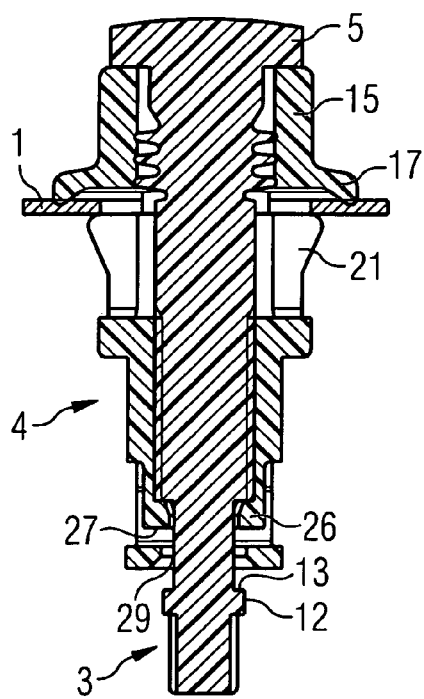

ADJUSTING UNIT FOR ADJUSTING A SPACING BETWEEN TWO MEMBERS

BACKGROUND OF THE INVENTION

The present invention relates to an adjusting unit for adjusting a spacing between a fixedly mounted first member and a resiliently mounted second member.

DE 101 47 141 A1 discloses an adjustable threaded connection assembly for mounting e.g. a vehicle backlight to a vehicle body sheet. Generally there is a gap between the backlight and other body parts of the vehicle, which gap should be minimized in particular for esthetical reasons. The prior adjustable screw connection assembly enables to adjust the spacing between the fixedly mounted body sheet and the resiliently mounted backlight in order to compensate for dimensional variations of the gap between the backlight and the other body parts due to manufacturing tolerances.

The prior art screw connection assembly consists of a nut and a screw. The nut which is fixed to the fixedly mounted first member includes a bore comprising a threaded portion and a smooth cylindrical portion. The screw which is adapted to be removably secured to the resiliently mounted second member via a coupling member, is provided with a plurality of annular sealing ribs which sealingly engage the smooth bore portion of the nut when the screw is adjusted relative to the nut. The adjusting screw has opposited ends each provided with a drive means so that it may be adjusted by a tool from each of its ends. The nut is a blind rivet nut which is fixed to the first member by a rivet deformation.

SUMMARY OF THE INVENTION

It is a primary object of the present invention to provide an adjusting unit for adjusting a spacing between a fixedly mounting first member and a resiliently mounted second member, with the adjusting unit being of simple structure and being adapted to be assembled in an extremely simple manner.

The adjusting unit of the present invention comprises an adjusting screw and a sleeve-like receiving member which are adjustable relative to each other via a pair of threads. The adjusting screw has an end provided with an abutment surface for being supported against the resiliently mounted second member, and the sleeve-like receiving member has an annular flange for being supported against said fixedly mounted first member. This allows to adjust the spacing between the two members by adjusting the adjusting screw relative to the receiving member.

Therefore the adjusting unit may be used e.g. for finely adjusting a resiliently mounted backlight of an automotive vehicle so as to compensate for dimensional variations of any gap between the backlight and other body members of the vehicle due to manufacturing tolerances.

A preferred embodiment of the present invention provides that said annular flange of said receiving member is held in engagement with said first member by a plurality of spring legs of said receiving member and said spring legs each have a face axially spaced from said annular flange by a predetermined axial spacing, and are deflectable radially inwards so as to enable the adjusting unit to be inserted into a hole of said first member and to deflect said spring legs until said first member is clamped between said faces of said spring legs and said annular flange.

As a result, in order to secure the adjusting unit at the fixedly mounted first member, the only thing necessary is to insert the preassembled adjusting unit into the hole of the first member. A riveting operation of the blind rivet nut as required in the prior art is not necessary so that assembly of the adjusting unit is drastically simplified. Furthermore, both the adjusting screw and the sleeve-like receiving member may be made of plastic materials which are to be adapted to each other. The adjusting screw and the receiving member may be manufactured in a very simple manner by injection molding so as to minimize manufacturing costs. Furthermore, corrosion problems are avoided thereby.

BRIEF DESCRIPTION OF THE DRAWINGS

A preferred embodiment of the present invention will be described with reference to the accompanying drawings wherein:

FIGS. 4 and 5 are perspective views of the adjusting unit;

FIG. 6 is a longitudinal section of an adjusting screw of the adjusting unit;

FIG. 7 is a longitudinal section of the sleeve-like receiving member of the adjusting unit;

FIG. 8 is a view of the adjusting unit similar to that in FIG. 1, however, in an end position of the adjusting screw;

FIG. 9 is view similar to FIG. 8 of the adjusting unit in an opposite end position of the adjusting screw.

DETAILED DESCRIPTION OF THE DRAWINGS

Figure 1:
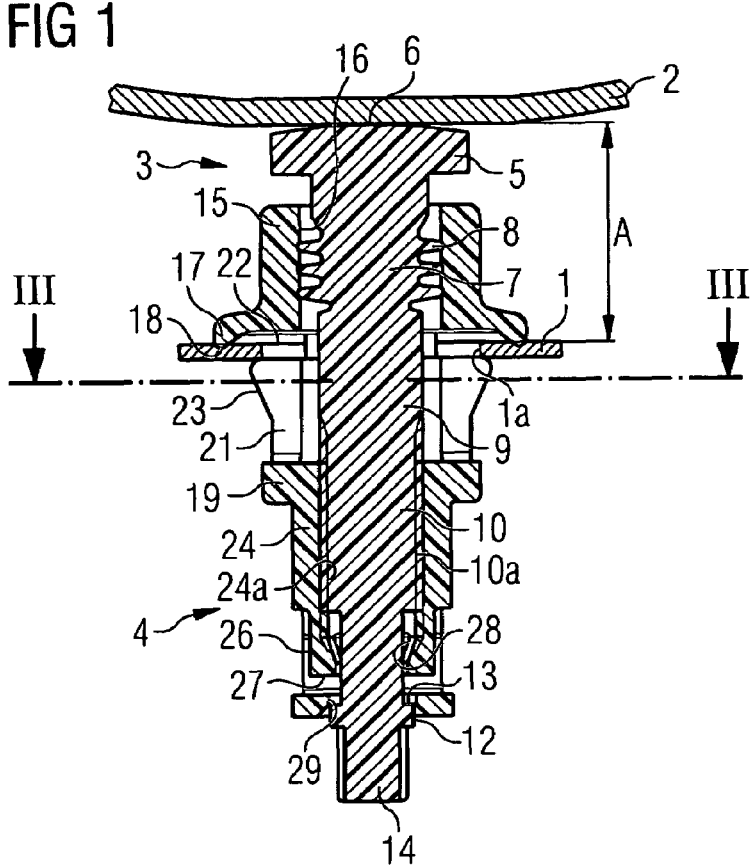
FIG. 1 is a longitudinal section of an adjusting unit of the present invention along lines I-I in FIG. 2.
Figure 2:
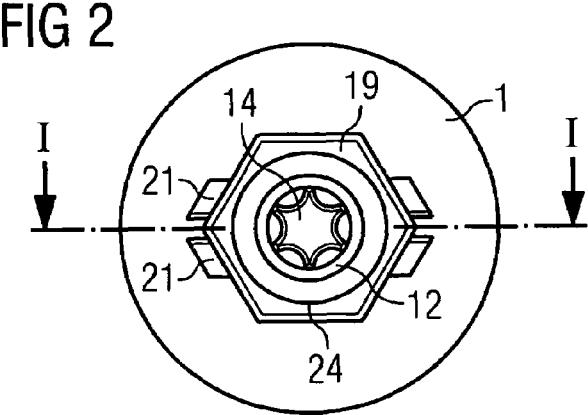
FIG. 2 is a view of the adjusting unit in FIG. 1 from below.
Figure 3:
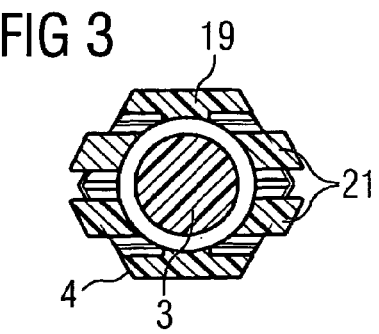
FIG. 3 is a sectional view along lines III-III in FIG. 1.

The adjusting unit shown in FIGS. 1 to 3 is arranged to adjust the spacing A between a fixedly mounted first member 1 and a resiliently mounted second member 2. The member 1, which is provided with a hole 1a, is e.g. a body sheet of an automotive vehicle, and the member 2 is e.g. a holder of a backlight which is resiliently biassed into a position as shown. As explained above, generally there is provided a gap (not shown) between the backlight and other body parts, which gap is to be minimized by the adjusting unit. The adjusting unit is arranged so that it can be pre-assembled, is of the self-locking type and is arranged to be fluid-tight in order to prevent fluids such as water, oil and gasoline vapors etc. from flowing from the environment into the space between the members 1 and 2.

The adjusting unit consists of an adjusting screw 3 and a sleeve-like receiving member 4. The adjusting screw 3 and the receiving member 4 can be made of plastic materials which are adapted to each other. More particularly, the plastic material of the adjusting screw is of a hardness exceeding that of the plastic material of the receiving member 4. The adjusting screw 3 is made of e.g. an impact resistant plastic material such as polyamid and may contain a fiber filler such as a glass fiber filler. The receiving member 4 can be made e.g. of a thermoplastic material. Basically, however, the plastic materials could be selected the other way around. Both the adjusting screw 3 and the receiving member 4 are manufactured preferably by injection molding.

The adjusting screw 3 comprises, as shown additionally in FIG. 6, a shaft having a head 5 which has an external abutment surface 6 for engaging the member 2, a sealing portion 7 including a plurality (three as shown) of annular sealing ribs 8, a cylindrical intermediate portion 9, a threaded portion 10 having threads 10a, a cylindrical portion 11 of reduced diameter, a collar 12 including a shoulder 13 and an end portion 14. The adjusting screw 3 has its both axial ends provided with a drive means which enables the adjusting screw 3 to be adjusted from both axial ends by means of a tool. To this end the head 5 is of hexagonal shape, and the end portion 14 is provided with an internal recess. It should be noted, however, that other drive means can be used.

The receiving member 4 comprises, as additionally shown in FIG. 7, a sleeve-shaped body having a thru-bore which is made up of a sealing portion 15, an annular flange 17, an intermediate portion 19, and a threaded portion 24.

The sealing portion 15 has a smooth cylindrical bore 16 which is sealingly engaged by the sealing ribs 8 of the adjusting screw 3 when the adjusting unit has been assembled. More precisely, the sealing ribs 8 are of a diameter exceeding that of the smooth cylindrical bore 16 such that they are urged against the wall of the bore 16 by a certain force. The soft material of the receiving member 4 yields the loading by the sealing ribs 8 such that the "hard" sealing ribs 8 dig radially into the "soft" wall of the bore 16. As a result the sealing ribs act not only as fluid seal means but also as securing means for securing the adjusting screw 3 in its axial positiion relative to the receiving member 4.

As indicated already above it would be possible to select the materials the other way round such that the receiving member 4 is made of a harder plastic material and the adjusting screw 3 is made of a softer plastic material.

The sealing portion 15 is followed by the annular flange 17 which is of a concave arcuate shape (as seen in a direction downwards in FIG. 7) such that its external rim is provided with an annular projection 18 projecting axially downwards.

The annular flange 17 is followed by the intermediate portion 19 which is of a polygonal (hexagonal in the embodiment) cross-section matingly shaped to the polygonal periphery of the hole 1a of the member 1. The intermediate portion 19 has diametrically opposite windows 20 which receive a plurality (four in the embodiment) spring legs 21.

The spring legs 21 have their lower axial ends integrally connected to the intermediate portion 19 while the remaining parts of the spring legs 21 are spaced from the material of the intermediate portion 19 such that they can be deflected radially inwards. The spring legs 21 have their upper axial ends each provided with a face 22 which is axially spaced from the bottom side of the annular flange 17 for a predetermined amount such that the first member 1 can be clamped between the annular projection 18 of the annular flange 17 and the faces 22 of the spring legs 21 as will be explained in more detail below.

Furthermore, the spring legs 21 have their radially outer rims provided with tapered surfaces 23.

The threaded portion 24 following the intermediate portion 19 has threads 24a which are in threaded engagement with the threads 10a of the adjusting screw 3 for enabling adjusting movements between the adjusting screw 3 and the receiving member 4. The threaded portion 24 has a lower area provided with a pair of diametrically opposed windows 25 each of which receives a spring leg 26. The spring legs 26 have their upper axial ends each integrally connected to the threaded portion 24, and the remaining parts of the spring legs are spaced from the material of the threaded portion 24 such that they can be deflected radially outwards. The spring legs 26 have their lower axial ends provided with faces 27 arranged to engage the shoulder 13 of the adjusting screw 3 for limiting the adjusting movements when the adjusting unit has been assembled, as will be explained in more detail below. Furthermore, the spring legs 26 have edges provided with tapered surfaces 28.

The axial thru-bore of the sleeve-like receiving member 4 has its axial lower end provided with a bore portion 29 which is of a diameter similar to the diameter of the collar 12 of the adjusting screw 3 such that the collar 12 can be passed through the bore portion 29. Operation of the adjusting unit will now be described:

Initially the adjusting unit will be pre-assembled by threadingly connecting the adjusting screw 3 and the receiving member 4. To this end the adjusting screw 3 is inserted into the receiving member 4 until the threads 10a and 24a of the adjusting screw 3 and the receiving member 4 threadingly engage each other. Relative rotation between the adjusting screw 3 and the receiving member 4 causes the adjusting screw 3 to be drawn axially into the receiving member 4. When the collar 12 of the adjusting screw 6 engages the tapered surface 28 of the spring legs 26, the spring legs 26 are deflected radially outwards. As soon as the collar 12 has passed the spring leges 26, the spring legs 26 return to their original position where they project into the portion 11 of the adjusting screw 3.

Adjusting movement of the adjusting screw 3 into the receiving member 4 is limited by the head 5 of the adjusting screw 3 abutting the upper end of the receiving member 4 as shown in FIG. 9. Adjusting movement of the adjusting screw 3 in the opposite direction is limited by the shoulder 13 of the collar 12 abutting the faces 24 of the spring legs 26 as shown in FIG. 8. When the adjusting unit is pre-assembled, the adjusting screw 3 is moved to a central position between its end positions such that the adjusting screw 3 can be displaced from this central position in opposite axial positions for a predetermined amount (for example +/−2 mm).

As mentioned above, the adjusting screw 3 is axially secured in its central position by the sealing ribs 8 engaging the cylindrical bore 16. Accordingly the adjusting unit has self-locking properties.

The pre-assembled adjusting unit will now be inserted into the fixedly mounted member 1 (e.g. body sheet) by inserting the adjusting unit into the hole 1a of the member 1 from above. To this end the polygonal cross-section of the intermediate portion 19 will be aligned to the polygonal periphery of the hole 1a of the member 1 in order to enable the intermediate portion 19 to be inserted into the hole 1a. When the tapered surfaces 23 of the spring legs 21 engage the edges of the hole 1a, the spring legs 21 are deflected radially inwards such that the spring legs 21 can be passed through the hole 1a. When the annular projection 18 of the annular flange 17 of the receiving member 4 engages the upper surface of the member 1, continuing axial pressure upon the adjusting unit will resiliently deform the annular flange 17 to a certain extent such that the spacing between the annular projection 18 and the faces 22 of the spring legs 21 will increase correspondingly. This allows the spring legs 21 to resiliently return to their original positions. When the axial pressure exerted upon the adjusting unit is being released, the member 1 will be clamped between the annular flange 17 and the spring legs 21 due to the elastic biassing of the annular flange 17. The adjusting unit is now fixed to the member 1.

Now the member 2 will be mounted to the vehicle body (not shown) such that it is resiliently urged against the end surface 6 of the adjusting screw 3 by the spring means (not shown). The adjusting screw 3 can now be axially displaced relative to the receiving member 4 and therefore relative to the member 1 by a tool (not shown) engaging the end portion 14 of the adjusting screw 3 so as to adjust the position of member 2 engaging the adjusting screw 3. Accordingly the member 2 can be fine-adjusted in its position to compensate for variations of its position due to manufacturing tolerances. In other words, the spacing A between the member 1 and 2 can be fine-adjusted to minimize any gaps between the member 2 (backlight) and further body parts (not shown).

The adjusting screw 3 is secured in its fine-adjusted position by the sealing ribs 8 engaging the wall of the bore 16. The member 2 can now be securely fixed in its fine-adjusted position by fastening means (not shown).

We claim:

1. An adjusting unit for adjusting a spacing between a fixedly mounted first member and a resiliently mounted second member,
    the adjusting unit comprising an adjusting screw and a receiving member,
    said adjusting screw being of one-piece structure and comprising a shaft provided with male threads, and a head,
    said receiving member being of one-piece structure and comprising female threads in engagement with said male threads so that said adjusting screw and said receiving member are adjustable relative to each other,
    said adjusting screw having an end provided with an abutment surface adapted to be supported against said resiliently mounted second member and said receiving member having an annular flange adapted to be supported against said fixedly mounted first member such that the spacing between said first and second members is adjustable by rotational movements of the adjusting screw relative to the receiving member,
    said head of the adjusting screw being adapted to engage said receiving member for limiting adjusting movements of said adjusting screw into said receiving member and said adjusting screw having an annular shoulder facing away from said head and adapted to engage said receiving member for limiting adjustment movements of the adjusting screw in a direction out of said receiving member such that, when the adjusting unit is being pre-assembled, the adjusting screw is moveable to a central position from which it may be displaced in opposite axial directions.

2. An adjusting unit as defined in claim 1 wherein said annular flange of said receiving member is held in engagement with said first member by a plurality of first spring legs of said receiving member.

3. An adjusting unit as defined in claim 2, wherein said spring legs each have a face axially spaced from said annular flange by a predetermined amount, and are deflectable radially inwards so as to enable the adjusting unit to be inserted into a hole of said first member and to deflect said first spring legs until said first member is clamp-ed between said faces of said first spring legs and said annular flange.

4. An adjusting unit as defined in claim 3 wherein said first spring legs are disposed in windows of an intermediate portion of said receiving member.

5. An adjusting unit as defined in claim 4 wherein said intermediate portion of said receiving member has a polygonal cross-section matingly shaped with respect to said hole of said first member.

6. An adjusting unit as defined in claim 3 wherein said first spring legs have external tapered surfaces for facilitating insertion thereof into the hole of said first member.

7. An adjusting unit as defined in claim 2 wherein said annular flange of said receiving member is of a concave arcuate shape so as to be axially deformable for a predetermined amount.

8. An adjusting unit as defined in claim 1 wherein said receiving member has a plurality of second spring legs deflectable radially outwards and arranged to be deflected radially outwards when the adjusting screw is screwed into the receiving member, and adapted to be deflected back when the second spring legs have passed said shoulder of said adjusting screw such as to engage said shoulder in order to limit adjusting movements of the adjusting screw in a direction out of said receiving member.

9. An adjusting unit as defined in claim 8 wherein said second spring legs of said receiving member are positioned in windows of said receiving member.

10. An adjusting unit as defined in claim 9 wherein said second spring legs of said receiving member have tapered surfaces cooperating with said adjusting screw.

11. An adjusting unit as defined in claim 1 wherein said adjusting screw has opposite axial ends each provided with drive means for engagement with a tool.

12. An adjusting unit as defined in claim 1 wherein said adjusting screw has at least one annular sealing rib sealingly engaging a smooth bore of a sealing portion of said receiving member.

13. An adjusting unit as defined in claim 12 wherein said annular sealing rib is of a diameter exceeding that of said smooth bore so as to provide for a self-locking action for securing said adjusting screw in its axial position relative to said receiving member.

14. An adjusting unit as defined in claim 1 wherein said adjusting screw and said receiving member are made of plastic material.

15. An adjusting unit as defined in claim 14 wherein the plastic material of said receiving member and the plastic material of said adjusting screw are plastic materials of different hardnesses.

* * * * *